3,036,076
PIPERAZINE DERIVATIVES

Rudolf Gabler, Zollikerberg, Zurich, and Hans R. Meyer, Kilchberg, Zurich, Switzerland, assignors to W. R. Grace & Co., Cambridge, Mass., a corporation of Connecticut
No Drawing. Filed May 18, 1960, Ser. No. 29,815
11 Claims. (Cl. 260—268)

This invention relates to 1,4-derivatives of butane-2,3-diol formed by reacting piperazine and N-substituted piperazine with 1,2,3,4-diepoxy butane. This invention also relates to a method of making such derivatives.

Piperazine itself has long been used as a basic raw material for a series of anthelmintic salts, antihistamines, motion sickness remedies, and tranquilizing drugs. It has also been considered for use in antifoaming compounds, corrosion inhibitors and detergents. Many of its derivatives also have significant potential as intermediates for pharmaceuticals, surfactants, dyes, and textile specialities. A great many of piperazine's N-substituted derivatives, however, are limited in their application because they are relatively insoluble in water.

The conventional method of increasing the solubility of such compounds has been to convert them into soluble salts such as the acetate, hydrochloride and hydrobromide salts. The usefulness of such salts is limited because they are stable only at a pH of less than 7 and the presence of foreign ions is also undesirable.

It has now been found that it is possible to obtain water soluble derivatives of piperazine which are completely stable even at a pH in excess of 7 and in which the activity of the piperazine component is preserved. This is accomplished by reacting either piperazine, methyl homologues thereof, or N-monosubstituted derivatives of either of the foregoing with 1,2,3,4-diepoxy butane. This reaction, which is carried out in the presence of an inert solvent and at low temperatures, proceeds according to the following formula

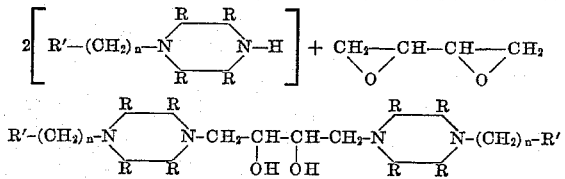

wherein $n$ is equivalent to 0, 1, 2, 3 or 4; R represents a radical selected from the group consisting of hydrogen and methyl; and R' represents a radical selected from the group consisting of hydrogen, methyl, ethyl, phenyl, acetyl, carbomethoxy, carboethoxy, carboxamide, N-methyl-carboxamide, N,N-dimethylcarboxamide, guanyl, dimethylphosphoryl, diamidophosphoryl, and diphenyl methyl. If piperazine or its methyl homologues are used in the above reaction, the reactive hydrogen grouping attached to the nitrogen in the final product may be easily replaced with the desired substituent.

This reaction results in yields of between 70% to 95% of that theoretically obtainable, even when either piperazine or its methyl homologue are used, which is quite surprising and unexpected. Usually 1, 2, 3, 4-diepoxy butane will only react with diamines to produce high molecular weight resins. In the past, low molecular weight products were only obtainable when primary monoamines of the aniline type were used as reactants and even then the reaction produced cyclic by-products.

This reaction is preferably carried out in the presence of a solvent since the polymerization proceeds exothermically and, in some cases, may proceed with explosive reactivity even at room temperature. Suitable solvents which may be used include water, alcohol, ether, hydrocarbons, halogenated hydrocarbons and certain ketones such as methylethyl ketone, and cyclohexanone. We prefer to use a solvent in which the reactants are soluble but in which the reaction product is insoluble. In such a case the separation of the reaction product, since it crystallizes out of the mixture, is relatively simple and can be carried out by filtering or centrifuging. The mother liquid, which generally contains an excess of the piperazine component, may be reused again in the reaction. We prefer to use an excess of the piperazine component in order to avoid resin formation and other undesirable side reactions although the reaction proceeds satisfactorily when stoichiometric amounts are used. Excesses as high as 5 times the stoichiometric amount do not interfere with the reaction especially when a N-monosubstituted piperazine is used as the reactant.

The reaction may be carried out at a temperature between 0° C. to 150° C. Above this temperature range oily or gelled high molecular weight by-products are formed which are difficult to separate from the relatively low molecular weight product even when the by-products occur in small quantities. The lower temperature limit is determined by the reaction rate. However, below 0° C. it requires five days or more in order to obtain reasonable yields. A temperature range between 20° C. to 25° C. is quite satisfactory. In this range the product's yields obtained, in one to four days, represent between 70% to 95% of that theoretically obtainable.

1,2,3,4-diepoxy butane has two asymmetric carbon atoms and normally exists as a mixture of the meso and d,l form. Generally this mixture is used for the preparation of the products of this invention. It is, however, also possible to use the pure isomers in this invention and these are obtained by a fractional distillation of the mixture. Furthermore, the d,l form may be separated into its optically active isomers by conventional methods and then used in this invention. All these diepoxy butanes show the same reactivity towards piperazine and its N-monosubstituted derivatives.

The piperazine-based components which may be used in this reaction include piperazine itself, methyl homologues of piperazine, and N-monosubstituted derivatives of piperazine and the methyl homologues thereof. The methyl homologues of piperazine include methyl piperazine, 2,5-dimethylpiperazine, 2,3-dimethylpiperazine, 2,6-dimethylpiperazine and trimethylpiperazine. It is advisable to use an excess of the piperazine-based component, over the theoretical amounts, when it is not substituted at the nitrogen in order to obtain good product yields. Such amounts may be 1 to 10 moles and preferably 3 to 5. In cases where monosubstituted piperazines are used, it is sufficient to react equivalent amounts of components or to use a slight excess of the substituted piperazine. The useful N-monosubstituted derivatives of piperazine include N-methylpiperazine, N-ethylpiperazine, N - (chloroethyl) - piperazine, N - isopropylpiperazine, N-octylpiperazine, N-dodecylpiperazine, N-phenylpiperazine, N-(4-chlorophenyl) - piperazine, N-(4-methoxyphenyl) - piperazine, N - butylpiperazine, N - (4-chlorobenzyl)-piperazine, N-(4-bromobenzyl)-piperazine, N-(benzhydryl)-piperazine, N-acetylpiperazine, N-(chloroacetyl)-piperazine, N-(trifluoroacetyl)-piperazine, N-(carboxymethyl) - piperazine, N-(carboxyethyl) - piperazine, N - (carboxamide)-piperazine, N-(methylcarboxamide)-piperazine, N - (dimethylcarboxamide) - piperazine, N-(methylphosphoryl)-piperazine, N - (amidophosphoryl)-piperazine and N-(methylamido-phosphoryl)-piperazine.

Example I 10 grams of 1,2,3,4-diepoxy butane (90% in d,l form)

were added to a solution of 100 grams of anhydrous piperazine (5 times the equivalent amount) in 220 ml. of pure chloroform. The clear solution was left standing, at room temperature, for 6 days. The solvent was then removed under reduced pressure in the absence of moisture and air. The colorless, solid residue was ground into a powder and heated at 100° C., under a pressure of 12 mm. Hg, to remove the excess piperazine. The crude dipiperazine adduct was distilled under a high vacuum (approx. 0.01 mm. Hg) at a temperature of 190° C. It was necessary to avoid overheating of the product in order to prevent decomposition thereof. 22.6 grams of a colorless distillate, 1,4-di(piperazino) butane-2,3-diol; d,l form, solidified in the receiver. This was 76% of the amount theoretically obtainable under these conditions. The product, which was further purified by recrystallization from 226 ml. of xylene, had a melting point of 146° C.

*Example II*

A concentrated solution of 114 grams of 2,5-dimethyl-piperazine in chloroform was mixed with 8.6 grams of 1,2,3,4-diepoxy butane. After standing six days, at room temperature, a solid residue of 1,4-di(2,5-dimethyl-piperazino) butane-2,3-diol was obtained. This was purified using the procedure set forth in Example I.

*Example III*

86 grams of 1,2,3,4-diepoxy butane (90% in d,l form) and 256 grams of N-monoacetyl-piperazine were dissolved in 1000 ml. of absolute ether. The solution, on standing at room temperature, gradually became turbid and an oil precipitated which solidified on further standing. After four and one half days, the mixture was heated for five hours under reflux. The colorless precipitate was broken up, filtered and dried under reduced pressure. 320 grams of crude adduct, 1,4-di(N-acetylpiperazino) butane-2,3-diol; d,l form, having a melting point of 136° C. were obtained. This was 93% of the amount theoretically obtainable. The final product was purified by recrystallization from xylene and had a melting point of 140° C.

*Example IV*

51.7 grams of 1,4-di(piperazino) butane-2,3-diol (as prepared in Example I) were mixed, with cooling, with 54 ml. of 90% formic acid. 34 grams of a 39% aqueous solution of formaldehyde were then added, with stirring, to the preceding mixture. The solution was then heated in such a manner that the resulting $CO_2$ formation did not proceed too violently. After the reaction had slowed down, the temperature of the mixture was raised to 100° C. and held at this point for 12 hours, and the volatile ingredients were removed in vacuum. The remaining oily residue was diluted with 200 ml. of water, the solution passed through a column containing 800 gms. of an ion exchange resin (i.e. a polystyrene quaternary amine type), and washed with water until neutral. The aqueous solution was then evaporated to dryness under reduced pressure. 57 grams of an oily residue were obtained which solidified completely after the addition and removal of some acetone. The product was purified by recrystallization from 300 ml. of acetone at −5° C. 41 grams of 1,4-di(N-methylpiperazino) butane-2,3-diol; d,l form having a melting point between 90°–92° C. were obtained. 3 more grams were recovered from the mother liquid by evaporation and cooling. The total yield was 85% of that theoretically obtainable. A purer product having a melting point of 98° C. was obtained by distilling the raw product at a temperature of 150° C. under a reduced pressure of 0.01 mm. Hg and subsequently recrystallizing the same.

*Example V*

176 grams of N-benzylpiperazine in 100 ml. of benzene were mixed with 43 grams of 1,2,3,4-diepoxy butane (90% in d,l form) in 100 cc. of benzene. The resulting mixture was refluxed for one and one half hours in air from which the carbon dioxide was excluded. The benzene was then evaporated from the system under reduced pressure. The solid residue remaining was crystallized from 500 ml. of absolute ethanol at 0° C. 151 grams of 1,4-di(N-benzylpiperazino) butane-2,3-diol; d,l form having a melting point of 118° to 119° C. were obtained. 13 more grams were recovered from the mother liquid by evaporation and cooling. The total yield was 78% of that theoretically obtainable. The final product, which was further purified by crystallization from 500 ml. of ethanol, had a melting point of 123° C.

*Example VI*

Similar to Example V meso-1,4-di-(N-benzylpiperazino)butane-2,3-diol (M.P. 160° C.) was prepared by using meso-butadiene dioxide.

We claim:
1. A 1,4-dipiperazine derivative of butane-2,3-diol having the structure:

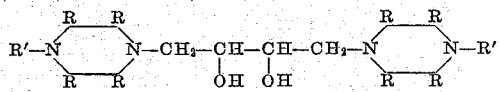

where R is a member selected from the group consisting of hydrogen and methyl and R' is a member selected from the group consisting of hydrogen, an alkyl group having 1 to 12 carbon atoms, phenyl, benzyl, acetyl, carbomethoxy, carboethoxy, carboxamide, N-methyl-carboxamide, N,N-dimethyl-carboxamide, guanyl, dimethylphosphoryl, diamidophosphoryl, and diphenyl methyl.

2. 1,4-di(piperazino) butane-2,3-diol.
3. 1,4-di(2,5-dimethylpiperazino) butane-2,3-diol.
4. 1,4-di(N-acetylpiperazino) butane-2,3-diol.
5. 1,4-di(N-methylpiperazino) butane-2,3-diol.
6. 1,4-di(N-benzylpiperazino) butane-2,3-diol.
7. A process for preparing 1,4-dipiperazino derivatives of butane-2,3-diol having the structure:

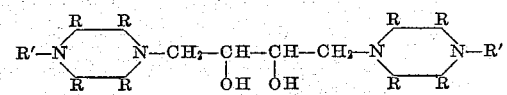

which comprises reacting one mole of 1,2,3,4-diepoxy butane with at least two moles of a piperazino compound having the structure:

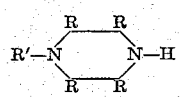

where R is a member selected from the group consisting of hydrogen and methyl and R' is a member selected from the group consisting of hydrogen, an alkyl group having 1 to 12 carbon atoms, phenyl, benzyl, acetyl, carbomethoxy, carboethoxy, carboxamide, No-methyl-carboxamide, N,N-dimethyl-carboxamide, guanyl, dimethylphosphoryl, diamidophosphoryl, and diphenyl methyl, said reaction being carried out at a temperature between 0° C.–150° C. and in the presence of a solvent in which both reactants are soluble and the product is insoluble.

8. A process according to claim 7 wherein the piperazino compound is piperazine.
9. A process according to claim 7 wherein the piperazino compound is 2,5-dimethylpiperazine.
10. A process according to claim 7 wherein the piperazino compound is N-monoacetyl-piperazine.
11. A process according to claim 7 wherein the piperazino compound is N-benzylpiperazine.

References Cited in the file of this patent

UNITED STATES PATENTS 2,861,084    Starcher et al. _____ Nov. 18, 1958

FOREIGN PATENTS 698,687    France _____ Nov. 28, 1930

OTHER REFERENCES

Chem. Abstracts, vol. 23, pages 4472–73 (1929).